United States Patent [19]

Hartmann

[11] 4,282,922
[45] Aug. 11, 1981

[54] LEAD COATED ALUMINA FIBER AND LEAD MATRIX COMPOSITES THEREOF

[75] Inventor: Hans S. Hartmann, Wilmington, Del.

[73] Assignee: E. I. Du Pont de Nemours and Company, Wilmington, Del.

[21] Appl. No.: 150,423

[22] Filed: May 16, 1980

[51] Int. Cl.$^3$ .............................................. B22D 19/14
[52] U.S. Cl. .................................. 164/97; 29/419 R; 427/226; 427/377; 427/380; 427/403; 427/404; 427/405; 427/419.2; 427/419.4; 427/419.7; 427/229
[58] Field of Search ............... 427/377, 413, 404, 405, 427/419.2, 419.4, 419.7, 224, 226, 229, 380; 29/419; 164/97

[56] References Cited

U.S. PATENT DOCUMENTS

| | | | |
|---|---|---|---|
| 2,932,071 | 4/1960 | Whitehurst | 164/97 |
| 2,979,424 | 4/1961 | Whitehurst et al. | 427/377 |
| 3,110,939 | 11/1963 | Lockwood | 164/97 |
| 3,713,865 | 1/1973 | Leeds | 427/377 |
| 3,849,181 | 11/1974 | Green | 427/224 |

FOREIGN PATENT DOCUMENTS

| | | | |
|---|---|---|---|
| 54-16515 | 2/1979 | Japan | 164/97 |
| 1731065 | 12/1971 | U.S.S.R. | 164/97 |

*Primary Examiner*—Ronald H. Smith
*Assistant Examiner*—Janyce A. Bell

[57] ABSTRACT

Lead-coated alumina fibers which are obtained by reduction of lead oxide in a glass coating on alumina fibers are particularly useful for making strong lead matrix composites.

5 Claims, 1 Drawing Figure

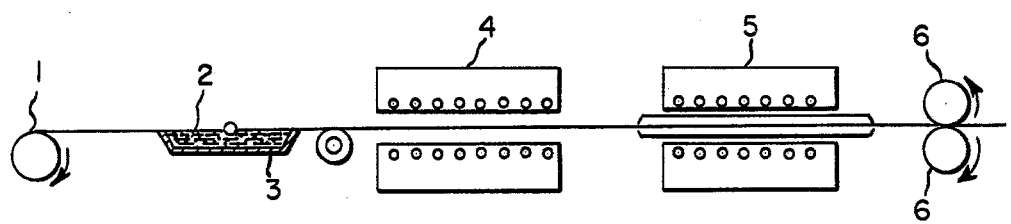

LEAD COATED ALUMINA FIBER AND LEAD MATRIX COMPOSITES THEREOF

BACKGROUND OF THE INVENTION

Improvements in energy density and cycle life of lead acid batteries are needed to keep them competitive with newer battery concepts. Battery plates of pure lead reinforced with high strength ceramic fiber provide increased energy density since ceramic fibers are lighter than lead. Corrosion resistance (cycle life) is also improved since pure lead is more corrosion resistant than the presently used lead alloys. However, pure lead does not wet alumina surfaces as well as desired.

Alumina can be wetted by aluminum by first depositing salts of cobalt, copper or nickel on the alumina fiber, converting the salts to an oxide, and then reducing the oxide to give a metallic coating. Molten aluminum may then be applied to the metal coated alumina. The use of this general approach in the lead-alumina system has yielded isolated islands of pure lead. Thus, when alumina fiber is treated with lead naphthenate, heated and reduced, the alumina surface bears isolated areas of pure lead.

It has now been found that application of a glass or precursor thereof containing at least about 74% lead oxide (PbO) to alumina filaments affords a coherent, uniform coating of metallic lead after heating and reduction. Such filaments yield excellent composites with pure lead.

SUMMARY OF THE INVENTION

This invention provides alumina fibers with a uniform coating of metallic lead made by applying to the alumina fiber, a solution or suspension of a glass containing at least about 74% lead oxide or an equivalent amount of a precursor thereof, e.g., lead acetate or lead nitrite, to provide a deposit that will yield between 0.3 and 4% by weight of lead on the fiber after reduction, heating the coated fiber to form an adherent glass film on the fiber and submitting the coated fiber to a reducing atmosphere at a temperature of from 600° C. to 900° C. to reduce the lead oxide to metallic lead. Useful composites from these fibers and pure lead containing 25 to 75 vol. % fiber can be made with tensile strength in excess of 16,000 psi.

DESCRIPTION OF THE DRAWING

The FIGURE is a schematic of the process for producing the lead-coated alumina filaments of the present invention.

DETAILED DESCRIPTION OF THE INVENTION

Useful filaments for the purposes of the present invention include continuous alumina filaments made by the process of U.S. Pat. No. 3,808,015, and provided with a coating of silica by the process of U.S. Pat. No. 3,837,891. In the FIGURE, they are taken off a supply bobbin 1 as a multifilament yarn and passed into a bath 2 in container 3 and led into an oven 4. The bath 2 is a solution or dispersion of a glass, or a precursor thereof, containing at least about 74% lead oxide. In place of the glass, precursors thereof, e.g., metal salts in solution, may be used, in which case the glass will form as the coated yarn passes through oven 4.

The nature of the liquid of the bath is not critical. Various solvents or dispersion medias can be used that will volatilize or burn away during the heating part of the process. Suitable solvents or dispersion media include: aqueous solutions of lower alcohols with suitable dispersion aids such as phosphates, and appropriate agents to modify the pH of the solution, such as ammonia or acetic acid, depending on the nature of the surface charges of the glasses or precursors to be dispersed in the liquid. Solutions or dispersions in aqueous acetic acid containing from about 0.5 to 5% glass are useful.

The yarn exiting the bath is impregnated with an amount of solution or dispersion to give a deposit that will yield between 0.3 to 4% (preferably 1%) lead on the fiber after reduction.

Additives may be added to alter the viscosity of the coating composition. For example, cellulose derivatives (methyl-, nitro-, etc.) in their respective solvents (alcohols, esters, etc.) increase the solution viscosity and thus help to keep particles in suspension. The cellulose derivatives also form films that glue the particles to the fiber surfaces.

In oven 4, the impregnated yarn is heated in air to a temperature that is sufficiently high to remove the solvent, convert any glass precursor to glass and cause adherence of the glass to the fiber. Temperatures at which the glass would drip from the fiber are to be avoided. A range of between about 500° and 1000° C. can be used, depending on the softening point and slope of the temperature-viscosity curve of the glass composition used.

The glass-coated alumina yarn is passed from oven 4 to oven 5 where the reduction of the lead glass coating can be done in any desired manner. The use of a mixture of hydrogen (10%) and nitrogen (90%) by partial pressure at a temperature of from 600° to 900° C. has been found useful. The yarn leaving oven 5 is forwarded by pinch rolls 6 and may be cut into desired lengths and stored. The yarn is constituted of individual alumina filaments having a lead surface. Some of the filaments are attached to each other as a result of the process and the yarn is generally too stiff to permit windup on a bobbin.

Suitable glasses can be found among those commercial glasses used for electronic solders, seals, or radiation shielding containing from 74 to 90% or more by weight PbO. Generally, the glasses will contain from about 45 to 72 or more mol % PbO, about 10 to 50 mol % $B_2O_3$ and/or $SiO_2$ with minor amounts of other oxides to modify the properties of the glass. Glasses used in dispersion should be fine powders, preferably passing a 200 mesh per inch (2.54 cm) screen.

The lead-coated fibers of this invention can be used in the form of continuous fibers to make unidirectionally oriented composites with lead by vacuum infiltration with molten lead as shown in the examples. The reinforced lead matrix composites may be used for making battery grids for heavy-duty industrial batteries. If desired, the fibers can be cut into short lengths to mix with molten lead for molding.

Testing Procedures

The metallic (i.e., reduced) lead content of a coated fiber was determined by treating a weighed sample with a 1:1 (volume) mixture of concentrated HCl and water to dissolve the metal(s), volumetrically diluting the solution and determining the lead content by atomic absorption using a Perkins Elmer Absorption Spectrophotometer Model 503. The lead content is reported as the weight % of the coated, reduced fiber and is based on the average of two determinations.

The tensile strength and modulus of the composites were determined by breaking samples of about 10 cm length having clamping tabs on each end parallel to the fiber direction on an Instron instrument with a rate of elongation of 0.05–0.15 cm/minute. The results given are the averages of at least three determinations.

EXAMPLE 1

A mixture of 136 grams (g) of powdered glass B of Table I, 209.8 g of glacial acetic acid and 340 ml of water was diluted with 1020 ml of water to give a solution containing 7.97% of the glass.

A yarn containing about 200 continuous filaments (average diameter of $20\pm5$ μm) of polycrystalline alumina (99% $Al_2O_3$), greater than 90% in the alpha form with a coating (0.02 to 0.2 μm thick) of silica with a nominal tensile strength of 220,000 to 270,000 psi (1580 to 1860 M Pa) and a tensile modulus of 50 to $55\times10^6$ psi (345–380 M Pa) was used.

The yarn was led through a bath of the above solution at 35° C., over a blotting roller through a 45 cm long oven at 900° C. open to air, through a 60 cm long oven at 900° C. containing a mixture of hydrogen/nitrogen (10/90%) and through a pair of pinch rolls that forwarded the yarn at 19 feet (5.8 cm) per minute. The cool, reduced yarn was relatively stiff with the uniformly light gray fibers adhered in the bundle.

An 8 inch (20.3 cm) length of 3 mm I.D. quartz tube was loaded with 1.4 g of the lead-coated yarn in about 20 cm lengths. One end of the loaded tube was repeatedly dipped in a melt of pure lead to provide a ball of solid lead as a seal. The open end of the tube was connected to a vacuum and the tube placed in a crucible containing pure lead at 360° C. The tube is inserted into the molten lead to a depth of about 20 cms. After two minutes, the lead seal melted and the yarn was infiltrated with lead which solidified in the top of the tube. The tube was removed from the lead bath and cooled. The quartz tube was broken off by light tapping, and the remaining quartz fragments removed by centerless grinding or etching with 25% by weight aqueous HF solution. Physical properties of the unidirectionally reinforced composite (25 vol % fibers) are shown under item a of Table II.

The above procedure was repeated using solutions containing 4.16 and 2.12% of glass B to yield fibers and composites under items b and c, respectively.

The procedure of item c was repeated using yarn of about 200 alumina fibers without a silica coating to give item d.

It is believed that the relatively low tensile values obtained with item a is due to the relatively large amount of glass coating on the filaments.

EXAMPLE 2

(This is a comparative example)

The procedure of items b and c of Example 1 was repeated with the same fiber but with a suspension of glass A to yield items e and f of Table II. It is believed that the relatively low tensile values obtained for items e and f result from the lower levels of lead in glass A as compared with others used herein.

EXAMPLE 3

Thirteen grams of glass C were mixed with 157.3 g of glacial acetic acid and stirred overnight at room temperature. The dispersion was diluted with 150 ml of water and used to coat a yarn using the procedure and fiber described for the production of item a of Example 1. Results are given under item g in Table II. Item h was made in the same manner except 5.6 g of glass C was used.

The same procedures were used to make items i and j from glass D and items k and l from glass E.

It is calculated that the coated fiber of item g contained 3.4% of the glass coating before reduction by assuming that the PbO was completely reduced and all the original other oxides were still present unreduced.

EXAMPLE 4

A mixture of 136.3 g of lead acetate $Pb(C_2H_3O_2)_2.3H_2O$ (14.2% water), 18.9 g $B_2O_3.H_2O$ and 21.2 g silica gel (90.8% water) was suspended in 272.7 g of glacial acetic acid and the solution diluted with 1320 ml of water. This suspension was equivalent to a 11.2% dispersion of glass D. The solution was used to coat fibers using the procedure of item a and results are given as item n in Table II.

EXAMPLE 5

The original, untreated alumina fibers of item a were made into composites using the techniques of Example 1. The results are given as item m in Table II.

TABLE I

| Glass Type | Glass Composition, Weight % | | | | | | | Softening Point °C. |
|---|---|---|---|---|---|---|---|---|
| | PbO | $B_2O_3$ | $SiO_2$ | ZnO | BaO | $Al_2O_3$ | $SnO_2$ | |
| A | 71.4 | 9.7 | 2.1 | 15.8 | 0 | 0 | 1.0 | ca 394 |
| B | 74.7 | 8.9 | 2.4 | 13.1 | 1.0 | 0 | 0 | ca 375 |
| C | 78.1 | 12.4 | 5.4 | 0 | 0 | 4.1 | 0 | 453 |
| D | 80.2 | 10.6 | 9.2 | 0 | 0 | 0 | 0 | — |
| E | 89.6 | 2.8 | 6.0 | 0 | 0 | 1.6 | 0 | 376 |

TABLE II

| Item | Glass Type | % in Coating Composition | % Lead On Fiber | Composite Tensile psi | M Pa |
|---|---|---|---|---|---|
| a | B | 7.97 | 6.1 | 14.6 | 101 |
| b | B | 4.16 | 3.2 | 18.1 | 125 |
| c | B | 2.12 | 0.7 | 22.0 | 152 |
| d | B | 2.12 | 0.4 estd. | 20.9 | 144 |
| e | A | 4.16 | 2.1 | 10.2 | 70 |
| f | A | 2.12 | 0.7 | 16.7 | 115 |
| g | C | 4.06 | 2.5 | 20.7 | 143 |
| h | C | 2.07 | 0.6 | 22.3 | 154 |
| i | D | 4.06 | 3.6 | 21.5 | 148 |
| j | D | 2.07 | 1.7 | 22.8 | 157 |
| k | E | 4.06 | 3.5 | 22.9 | 158 |
| l | E | 2.07 | 1.5 | 26.9 | 186 |
| m | None | 0 | 0 | 13.9 | 96 |
| n | — | — | 3.8 | 19.7 | 136 |

I claim:

1. A process for preparing lead-coated alumina fibers useful for reinforcement in lead matrix composites, comprising applying to the alumina fibers a solution or dispersion of glass containing at least about 74% lead oxide or an equivalent amount of a precursor thereof, heating the coated fiber to form an adherent glass film on the fiber and submitting the coated fiber to a reducing atmosphere at a temperature of from 600° C. to 900° C. to reduce the lead oxide to metallic lead.

2. A process according to claim 1 wherein the glass deposited on the fiber will yield between 0.3 and 4% of lead on the fiber after reduction.

3. A process according to claim 1 wherein the alumina fibers coated with the solution or dispersion of glass are heated in air at a temperature between 500° C. and 1000° C. to form an adherent glass film.

4. A process according to claim 1 wherein the glass contains at least about 45 mol % of PbO and about 10 to 50 mol % $B_2O_3$ and/or $SiO_2$.

5. A process for preparing a lead matrix composite wherein lead-coated alumina fibers of claim 1 are infiltrated with molten lead and the lead solidified.

* * * * *